Nov. 18, 1969  C. R. MERIGOLD ET AL  3,478,597
PARTICLE SIZE MONITOR

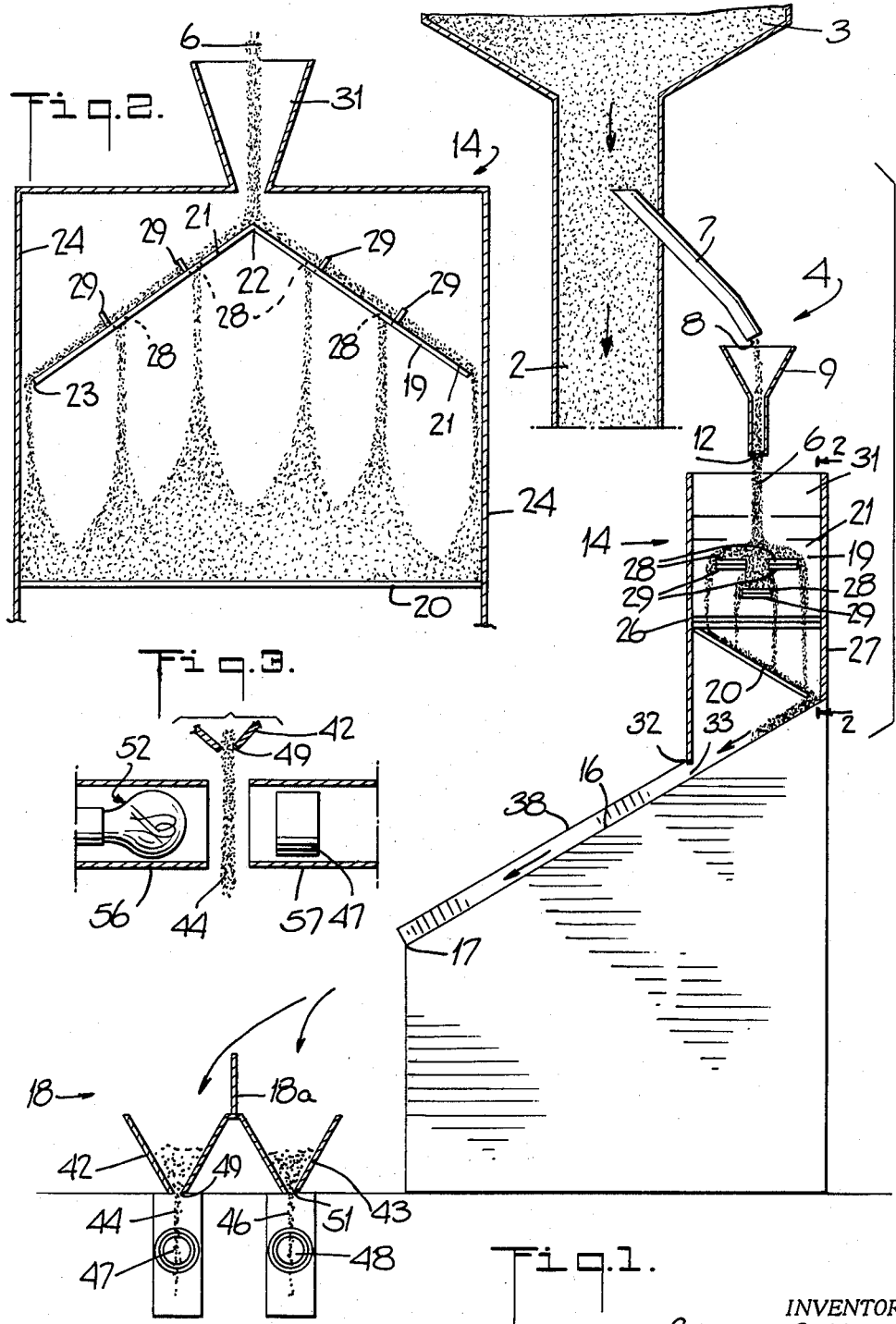

Filed Feb. 15, 1967                                2 Sheets-Sheet 2

INVENTORS
CHARLES R. MERIGOLD
WILLIAM C. BAUER
BY
Abner Sheffer
ATTORNEY

United States Patent Office 3,478,597
Patented Nov. 18, 1969

3,478,597
PARTICLE SIZE MONITOR
Charles Reynolds Merigold, Golden, and William Charles Bauer, Boulder, Colo., assignors to FMC Corporation, New York, N.Y., a corporation of Delaware
Filed Feb. 15, 1967, Ser. No. 616,306
Int. Cl. G01n 1/00; B07c 9/00; B07b 13/10
U.S. Cl. 73—422
10 Claims

ABSTRACT OF THE DISCLOSURE

A continuous supply of fine angular hard particles is distributed across the upper portion of an inclined plane in an apparently thin flat stream. The size distribution of the material is determined by the amounts of the different sized particles falling at different distances from the point where they leave the plane. The monitoring of the size distribution is by use of photoelectric devices.

---

This invention relates to a device suitable for continuously monitoring the size distribution in a mass of particles.

It has been found that free-flowing granular solids (such as sand, fertilizers and detergents) show undesirable particle segregation on storage. Thus, the solids discharged from a given storage bin can vary drastically in particle size distribution from hour to hour. See the article by Van Denburg and Bauer on "Segregation of Granular Materials in Storage Bin" in Chemical Engineering, vol. 71, pages 135 to 142, Sept. 28, 1964. The resulting non-uniformity can have important effects on the subsequent use of the granular material. For example, non-uniformity in the crushed coal fed to furnaces for power generation can cause hot spots, channeling and non-uniform combustion; and non-uniformity of the sand used in the making of glass can cause undesirable variations and defects in the quality of resulting glassware.

Methods for determining the particle size distribution using a series of screens have been described previously, as in the Van Denburg and Bauer article mentioned above, and in U.S. Patent 2,782,926.

A wide variety of techniques for measuring particle sizes has been suggested in the past. For example, the book "Fine Particle Measurement," by Orr and Dallavalle (Macmillan Co., New York, 1959) discusses such techniques as microscopy, sieving, sedimentation, inertial techniques (including trajectory methods, centrifugal methods, cascade impactors, electrostatic preparation, sonic analysis, diffusion battery and adhesion methods), radiation scattering and transmission, premeametry, and gas and liquid absorption. Other discussions of various techniques for this purpose are found in the ASTM Special Technical Publication No. 234 (1959) and "Particle Size Determination" by Cadle (Interscience Publishers, 1955).

According to one aspect of this invention, the particle size distribution is continuously monitored by continuously supplying a stream of the particles, continuously distributing a layer of the particles at the upper portion of an inclined surface, passing the particles down that surface under the influence of gravity, the inclined surface being so positioned that the particles travelling down it then leave it and travel through the air at velocities dependent on the speeds they attain during their travel down said surface, and measuring the relative amounts of particles falling at different distances from the point where they leave said surface.

In the drawing, which illustrates, schematically, one preferred form of the invention:

FIGURE 1 is a side view, partly broken away, of the monitoring device, and also shows schematically its relationship to a storage bin and sampling device;

FIGURE 2 is an end view along the line 2—2 of FIG. 1;

FIGURE 3 is an end view of part of the device, showing a light source and a photoelectric cell;

Figure 4:
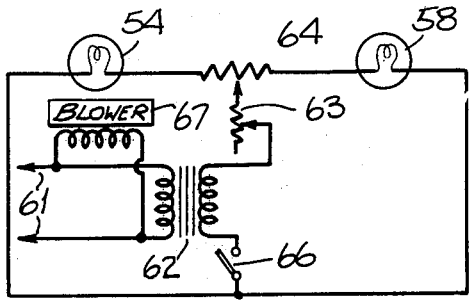
FIGURE 4 is a diagram of the electric circuit of the light sources used in the device.

Referring now to FIG. 1 of the drawing, a predetermined representative portion is removed continuously from the main stream 2 of granular particles being discharged downward, by gravity, from a storage bin 3, by any suitable sampling means 4, to produce a continuous sample stream 6. Any suitable type of sampling device may be used. The sampling device illustrated in FIG. 1 is of the stationary type and comprises simply a sampling tube 7 inserted into the main stream 2 at an inclination (e.g. 45°) to the horizontal greater than the angle of repose of the particulate material so that a stream of the particle flows through the tube 7, and through its discharge outlet 8, only when there is main stream flow. (If desired, there may be an automatic shut-off gate, responsive to cessation of main stream flow, at said outlet 8.) From the discharge outlet 8 the particles fall into the mouth of a funnel 9; if there is a very large flow through the tube 7, excess particles will overflow over the top of the funnel, for return to the main stream.

The continuous sample stream 6 of particles falls from the bottom of the funnel, leaving through an orifice 12 of predetermined diameter, to a distributor 14 from which the particles continuously fall onto, and slide down, an inclined surface, which is most simply an inclined plane 16. On reaching the lower end 17 of the plane, they fall freely through the air. Although the paths of the various particles down the plane are essentially identical, the relative effects of the frictional forces (between the particles and the surface of the plane 16, and between the particles and the air) are greater on the particles of smaller mass. These smaller particles attain a lower velocity than those of larger mass and fall closer to the end of the inclined plane. A monitoring assembly 18, preferably having a dividing baffle 18a continuously measures the relative amounts of the particles falling at different distances from the end of the plane, and thereby gives an indication of the particle size distribution.

More particularly, the distributor 14 may comprise an arrangement including a multi-orificed plate, such as the plate 19 and an inclined baffle 20, which arrangement serves to distribute the particles more or less uniformly across the width of the inclined plane 16. Preferably the distribution is such that the layer of particles on plane 16 is not substantially more than one particle in depth, so that the particles on that plane travel down it more or less independently of each other without substantial hindrance or interference from adjacent particles. As shown in FIG. 2, the plate 19 may be tent-like, being formed of two inclined apertured metal plane sheets 21 whose upper ends meet at a central ridge 22, and whose lower, horizontal, edges 23 are spaced from adjacent vertical side walls 24 of the distributor 14. The distributor also has parallel, vertical, front and rear walls, 26 and 27 respectively, and each of the inclined edges of the sheets 21 abuts against the adjacent front or rear wall.

In the illustrative form shown in the drawing, the openings 28 in the sheets are rectangular and there is a baffle 29 just downstream of each such opening to direct the particles into that opening. As can be seen from FIGS. 1 and 2, the stream of particles enters the distributor through a trough-like inlet 31, hits the sheets 21 adjacent the ridge 22, tends to spread out laterally as it passes down the sheets 21, and is divided into a number of sub-streams by the openings 28 and baffles 29. The sub-streams falling from the sheets 21 (including the sub-streams leaving the lower edges of those sheets) hit the inclined baffle 20 and again tend to spread out laterally as they travel down that baffle to the inclined plane 16. The trough-like inlet 31 is positioned to direct the stream to a position which results in the most uniform particle distribution across the width of the inclined plane 16.

The front wall 26 extends downwardly over the inclined plane 16 and its horizontal lower edge 32 is parallel to, but a short distance (e.g. ⅛ inch) above, the adjacent portion of that inclined plane, so that there is, in effect, a narrow horizontal slit 33 extending across the inclined plane; this serves to permit the passage of sliding particles and to minimize passage of "bouncing" particles, but some slight bouncing is observed in the particles moving down the plane. The plane 16 preferably has side walls 38 to prevent the particles from spilling over the sides thereof.

The slope of the plane is preferably such that free fall spread pattern of the particles is at an optimum. For any given particulate material, if the slope is too great, the particle separation is poorer, and if the slope is too small the particles will tend to merely trickle over the end of the plane. With this in mind, the best slope can be easily determined by simple experimentation with the given particulate material. Thus, for glassmaking sand of the following particle size distribution:

| Size (mesh): | Cumulative percent |
| --- | --- |
| +30 | Trace |
| +40 | 6 |
| +50 | 35 |
| +70 | 77 |
| +100 | 93 |
| −140 | 1 | a slope of about 30° has given best results with a smooth stainless steel plane about 8½ inches long.

The monitoring assembly 18 preferably includes the upstanding baffle or splitter 18a for classifying the freely falling particles into two fractions (e.g. a coarse and a fine fraction), and a device for measuring the relative amounts of these two fractions. In a particularly suitable construction, the fractions are collected in two separate compartments or bins 42 and 43, and flow out of the bins in two streams 44, 46, past individual photocells 47, 48 which measure the relative optical densities of these streams. More particularly, the bins 42, 43 have tapered bottoms with central openings 49, 51, so that the material collected in each bin is concentrated into a relative narrow stream, the openings 49, 51 being of sufficient size to permit free flow of the particulate material. At one side of each stream 44, 46 there is a light source 52 (FIG. 3) directed at the corresponding photocell 47 or 48 which is at the opposite side of the same stream, so that the light passes from each source, through the corresponding stream, to the appropriate photocell. Any suitable light source may be employed, such as a lamp 54 situated in a tubular housing 56 to direct a beam of light at the photocell located in a similar housing 57 axially aligned with the lamp housing.

A typical electrical circuit for the light sources (which, typically, are 6-volt D.C. miniature incandescent lamps 54, 58; see FIG. 4) includes a power supply (e.g. 117 volts A.C.) 61, a step-down transformer 62, an adjustable power rheostat 63 to control the light intensity, an adjustable power rheostat 64 to balance the intensities of the two lamps, a switch 66, and an electric motor-driven blower 67, used to prevent material dust or fines from accumulating on the lamps, photocells, and in the tubular housing, which would obstruct the light path.

Figure 5:
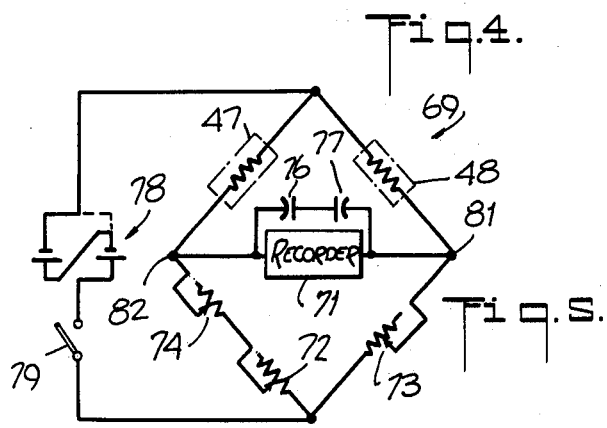
FIGURE 5 is a diagram of the electric circuit of the photoelectric cells and voltage recorder.

The photocells 47, 48 (which typically are of the CdSe type) are preferably part of an adjustable bridge network 69 (FIG. 5) which includes a millivolt recorder 71, a pair of adjustable power rheostats 72 and 73 (e.g. 5000 ohm rheostats) and, for fine adjustment of the bridge circuit, another power rheostat 74 (e.g. a 250 ohm rheostat), as well as a pair of opposing capacitors 76, 77 (e.g. of 2000 mfd. capacity) in a circuit paralleling the recorder 71. These two capacitors are placed in the circuit to "dampen" minor fluctuations resulting on the chart recorder since the CdSe photocells are highly sensitive. Like poles of these two electrolytic capacitors are connected to eliminate polarity. A single non-polarized capacitor may be used instead, if desired. The power for the bridge network may be a pair of 1.4 volt D.C. batteries 78 in series, connected to the network through a switch 79.

Figure 7:
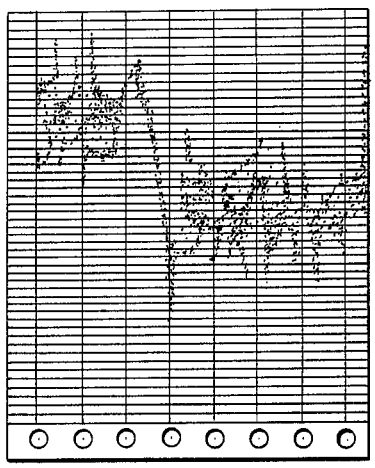
FIGURES 6 and 7 are specimens of recorder charts produced in the use of the device.
Figure 6:
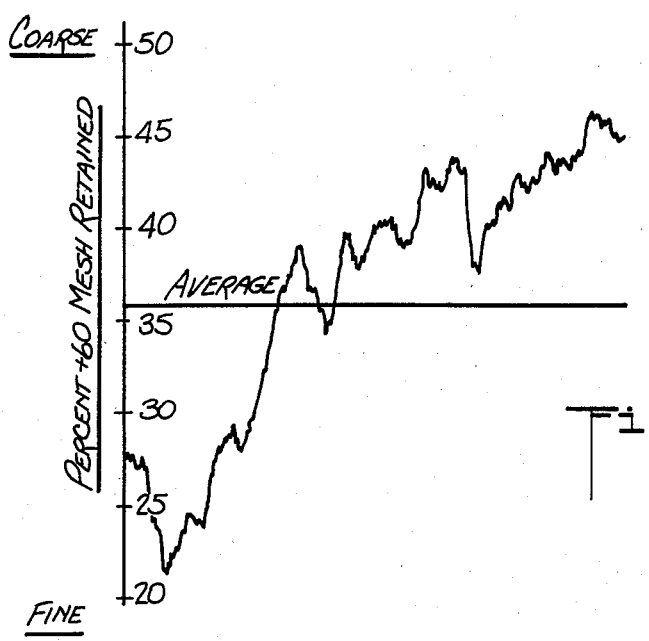

In the use of the system, the usual adjustments of the bridge rheostats 72, 73 are made so that the voltages at the points 81, 82 of the network 69 are identical when the light paths between the lamps 54, 58 and photocells 47, 48 are unobstructed. A representative batch of the particular type of granular material for which the apparatus is to be used is then run through the apparatus and a record of the variations in potential differences between points 81 and 82 is made by the recorder 71 (the voltage being positive when the optical density at photocell 48 is higher than that at photocell 47, and vice versa) to give a recorder chart which indicates the expected maximum (peaks) of the positive and negative voltages. By adjusting the horizontal and vertical positions of the splitter 18a and the settings of the rheostats 72, 73, 74, these peaks can be positioned so that they will fall equidistantly from center line on the recorder chart and near the outer borders of the chart; the center line of the chart then represents an average size distribution and the borders of the chart represent approximately the greatest expected variations in size distribution. Thereafter, the apparatus is used for continuous monitoring of the material in a storage bin, producing a recorder chart of the kind shown in FIGS. 6 and 7. The recording of FIG. 6 was made continuously while the chart paper moved rapidly along its time axis; only a small portion of the chart is shown, to illustrate the variations which occur during the recording. The record shown in schematic fashion in FIG. 7 was made as a series of dots, imprinted one every two seconds on a relatively slow moving chart. Each of these charts can be easily analyzed statistically to calculate the average distribution over a predetermined period of time.

Figure 8:
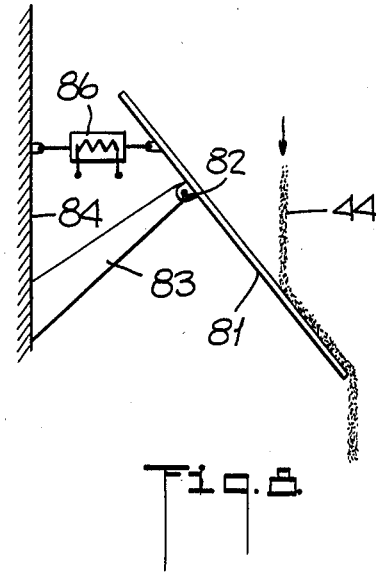
FIGURE 8 is a view of a modified form of device for measuring the relative amounts of particles falling at different distances.

A photocell system as illustrated is advantageous because photocells are highly sensitive and no moving parts are needed. The photocells may be activated by transmitted light, as illustrated, or by light reflected from the particles. It is within the broader scope of the invention to use other methods of continuously measuring the relative amounts in the streams 44, 46. In one such less desirable method, each of the streams 44, 46 (of FIG. 1) strikes a solid surface, and the force exerted by this impact is measured continuously. More particularly, as illustrated in FIG. 8, the stream 44 falls against the lower end of an inclined plate 81 mounted on a horizontal pivot 82 supported by a strut 83 attached to a frame member 84. The force exerted by the stream 44 on the plate 81 is measured by a load cell or strain gauge 86 connected between the upper end of plate 81 and the frame member 84. To similarly measure stream 46 there is a second arrangement identical with that of FIG. 8; the relative amounts of particles in streams 44 and 46 may be determined by comparing the electrical outputs of the two strain gauges, using suitable bridge networks like those of FIG. 5 in a manner known to those skilled in the art, to produce records like those of FIG. 6 or 7.

It will be understood that it is not necessary to determine absolute screen mesh sizes in the use of the apparatus, and such use, therefore, saves the considerable expense and manpower needed for comparable screen analyses. The operation of the apparatus has, however, been checked against repeated screen analyses; very good agreement was obtained.

The invention is particularly suitable for use with mixtures containing particles whose diameters are less than one inch, preferably particles of diameter not above about 1/8 inch but sufficiently large to be retained on a 140 mesh (U.S. Standard) screen. In use, the particles may be fed to the device at such a rate that they seem to the naked eye to form a "sheet" (i.e. an apparently continuous thin flat stream) flowing down the inclined plane or chute 16. Typical rates are as follows, for the monitoring of the particle size of sand, using a device whose inclined chute 16 is about 8½ inches long and about 3¾ inches wide: 120 grams per minute (when the metering orifice 12 has a diameter of 11/64 inch), 158 grams per minute (orifice diameter 12/64 inch), 188 grams per minute (orifice diameter 13/64 inch), 232 grams per minute (orifice diameter 14/64 inch), 282 grams per minute (orifice diameter 15/64). Even at the 282 gram per minute rate, the device gives an accurate indication of particle size distribution. The sand used in these particular tests had a density of 2.55 (silica) and, when loosely packed, its void volume was about 40% (i.e. the bulk density was about 60% of the true density); it had the following screen analysis:

| Size (mesh): | Cumulative percent |
| --- | --- |
| +30 | 1.97 |
| +35 | 8.66 |
| +40 | 21.47 |
| +45 | 38.55 |
| +50 | 57.60 |
| +60 | 73.33 |
| +70 | 81.96 |
| +80 | 88.64 |
| +100 | 94.74 |
| +120 | 97.44 |
| −120 | 2.56 | the average size (−45+50 mesh) is about 0.326 mm. It will be seen that at these rates thousands of particles per second are flowing down the chute. Some idea of the number of particles can be obtained from following estimates of the number of sand particles of a given screen size per gram:

| Fraction (mesh size): | Number of particles per gram |
| --- | --- |
| −35+40 | 6,000 |
| −45+50 | 16,900 |
| −50+60 | 28,500 |
| −70+80 | 80,000 |
| −80+100 | 135,300 |

Usually it takes less than a second for a given particle to travel the length of the 8½ inch chute.

The device has also been found to be suitable for the monitoring of mixtures of different materials such as mixtures of sand particles and needle-shaped particles of soda ash (e.g. a 75% sand-25% soda ash mixture of about 40–200 mesh particle size). These are fine hard angular particles.

Although the present invention has been described with reference to particular embodiments and examples, it will be apparent to those skilled in the art that variations and modifications can be substituted therefor without departing from the principles and true spirit of the invention.

Proportions herein described are by weight unless otherwise indicated.

What is claimed is:

1. Process for monitoring the size distribution in a mass of fine angular hard particles which comprises continuously supplying a stream of said particles, continuously distributing said particles at the upper portion of an inclined surface so that said particles travel down said surface under the influence of gravity as an apparently continuous thin flat stream, said inclined surface being so positioned that the particles travelling down it then leave it at a lower level of said inclined surface and travel through the air at velocities dependent on the speeds they attain during their travel down said surface, and measuring the relative amounts of particles falling at different distances from the point where they leave said surface.

2. Process as in claim 1 in which said particles slide down said surface substantially independently.

3. Process as in claim 1 in which said particles leaving said surface are subdivided into separate streams in accordance with the distances they have traversed from said point, and the relative amounts of particles in said separate streams are measured.

4. Apparatus for monitoring the size distribution in a mass of fine angular hard particles which comprises an inclined surface, means for receiving said particles and distributing them at the upper part of said inclined surface whereby the particles travel down said surface under the influence of gravity as an apparently continuous thin flat stream, said inclined surface being so positioned that the particles travelling down it then leave it at a lower level of said inclined surface and travel through the air at velocities dependent on the speeds they attain during their travel down said surface, and means for measuring the relative amounts of particles falling at different distances from the point where they leave said surface., 5. Apparatus as in claim 4 in which said measuring means includes means for subdividing the fallen particles in separate streams in accordance with the distance they have traversed from said point, and means for measuring the relative amounts of particles in said separate streams.

6. Apparatus as in claim 4 and including a particle sampling means operatively associated with a conduit carrying a stream of particles withdrawn, for use, from a storage bin, said sampling means continuously supplying particles to said receiving and distributing means while said stream of withdrawn particles is flowing.

7. Apparatus as in claim 4 and including a distributor for separating the particles and supplying them to said upper part of the inclined surface so spaced that they slide down the inclined surface substantially independently of each other.

8. Apparatus as in claim 7 in which said surface is an inclined plane, and there is a wall spaced slightly above the upper part of the plane to form a slit permitting the passage of particles sliding down the plane.

9. Apparatus for monitoring the size distribution in a mass of particles which comprises an inclined surface, means for receiving the particles and distributing them at the upper part of said inclined surface whereby the particles travel down said surface under the influence of gravity, said inclined surface being so positioned that the particles travelling down it then leave it at a lower level of said inclined surface and travel through the air at velocities dependent on the speeds they attain during their travel down said surface, and means for measuring the relative amounts of particles falling at different distances from the point where they leave said surface, said measuring means including photoelectric means for optically detecting the relative amounts of said particles.

10. Apparatus for monitoring the size distribution in a mass of particles which comprises an inclined surface, means for receiving the particles and distributing them at the upper part of said inclined surface whereby the particles travel down said surface under the influence of gravity, said inclined surface being so positioned that the particles travelling down it then leave it at a lower level of said inclined surface and travel through the air at velocities dependent on the speeds they attain during their travel down said surface, and means for measuring the relative amounts of particles falling at different distances from the point where they leave said surface, said measuring means including means for subdividing the fallen particles in separate streams in accordance with the distance they have traversed from said point, and means for measuring the relative amounts of particles in said separate streams, including means for directing light against said separate streams and photoelectric means for receiving the light from said streams and means for comparing the electric outputs generated by the light received from said separate streams.

References Cited

UNITED STATES PATENTS

| | | | |
|---|---|---|---|
| 67,130 | 7/1867 | Merrill | 209—115 |
| 2,665,409 | 1/1954 | Rogers | 73—422 XR |
| 2,995,026 | 8/1961 | Schmidt | 73—421 XR |
| 3,142,180 | 7/1964 | Glezen et al. | 73—432 |
| 3,377,597 | 4/1968 | Muta | 73—432 XR |

LOUIS R. PRINCE, Primary Examiner

HARRY C. POST III, Assistant Examiner

U.S. Cl. X.R.

209—112, 116